(12) United States Patent
Itoh et al.

(10) Patent No.: US 7,390,543 B2
(45) Date of Patent: Jun. 24, 2008

(54) MOLDED OBJECT OBTAINED THROUGH STRETCHING AND THERMAL FIXING AND PROCESS FOR PRODUCING THE SAME

(75) Inventors: Takurou Itoh, Yokohama (JP); Takuya Kaneda, Yokohama (JP); Hiroto Watanabe, Yokohama (JP)

(73) Assignee: Toyo Seikan Kaisha Ltd., Tokyo (JP)

( * ) Notice: Subject to any disclaimer, the term of this patent is extended or adjusted under 35 U.S.C. 154(b) by 413 days.

(21) Appl. No.: 10/484,188

(22) PCT Filed: Jul. 19, 2002

(86) PCT No.: PCT/JP02/07353

§ 371 (c)(1),
(2), (4) Date: May 28, 2004

(87) PCT Pub. No.: WO03/008178

PCT Pub. Date: Jan. 30, 2003

(65) Prior Publication Data

US 2004/0210031 A1    Oct. 21, 2004

(30) Foreign Application Priority Data

Jul. 19, 2001    (JP) .............................. 2001-220162

(51) Int. Cl.
| B32B 27/08 | (2006.01) |
| B32B 27/06 | (2006.01) |
| B32B 27/36 | (2006.01) |
| B65D 1/00 | (2006.01) |
| B65D 1/02 | (2006.01) |

(52) U.S. Cl. ...................... 428/35.7; 428/36.92; 428/480
(58) Field of Classification Search ................ 428/35.7, 428/36.92, 480
See application file for complete search history.

(56) References Cited

U.S. PATENT DOCUMENTS

| 4,356,142 A | 10/1982 | Germanio |
| 4,481,163 A | 11/1984 | Ota et al. |
| 5,076,983 A | 12/1991 | Loomis et al. |
| 5,409,751 A | 4/1995 | Suzuki et al. |
| 5,443,780 A | 8/1995 | Matsumoto et al. |
| 5,910,545 A | 6/1999 | Tsai et al. |
| 6,248,430 B1 | 6/2001 | Toyoda et al. |
| 6,290,896 B1 | 9/2001 | Suzuki et al. |

FOREIGN PATENT DOCUMENTS

| EP | 1 057 915 A | 12/2000 |
| JP | 7-205278 A | 8/1995 |
| JP | 7-207041 A | 8/1995 |
| JP | 7-308961 A | 11/1995 |
| JP | 8-73628 A | 3/1996 |
| JP | 8-108955 A | 4/1996 |
| JP | 9-12748 A | 1/1997 |
| JP | 9-25345 A | 1/1997 |
| JP | 9-31216 A | 2/1997 |
| JP | 9-157408 A | 6/1997 |
| JP | 9-174674 A | 7/1997 |
| JP | 09 224488 A | 9/1997 |
| JP | 10-249925 A | 9/1998 |
| JP | 10-315318 A | 12/1998 |
| JP | 11-116784 A | 4/1999 |
| JP | 11-147379 A | 6/1999 |
| JP | 11-302521 A | 11/1999 |
| JP | 2000-108542 A | 4/2000 |
| JP | 2001-18290 A | 1/2001 |
| JP | 2001-122989 A | 5/2001 |
| JP | 2001-150531 A | 6/2001 |
| JP | 2001-162676 A | 6/2001 |
| JP | 2001-191407 A | 7/2001 |
| JP | 2001-192478 A | 7/2001 |
| JP | 2001-347623 A | 12/2001 |
| JP | 2002-11778 A | 1/2002 |
| JP | 2002-120466 A | 4/2002 |
| JP | 2002-167497 A | 6/2002 |
| JP | 2002-201293 A | 7/2002 |
| JP | 2002-248677 A | 9/2002 |
| WO | WO 94/07941 | 4/1994 |
| WO | WO 03/037624 A | 5/2003 |
| WO | WO 2006/002409 | 1/2006 |

OTHER PUBLICATIONS

U.S. Appl. No. 11/629,733.

*Primary Examiner*—Alicia Chevalier
*Assistant Examiner*—Christopher P Bruenjes
(74) *Attorney, Agent, or Firm*—Hahn & Voight; Roger C. Hahn

(57) ABSTRACT

A draw-molded and heat-set article obtained by draw-molding and heat-setting a hydroxyalkanoate resin comprising chiefly a polylactic acid, the draw-molded and heat-set article having a half-width (X) of a diffraction peak of 2θ=10 to 25° of not larger than 1.220° and, particularly, not larger than 1.100° as found by a broad-angle X-ray measurement. The molded article possesses excellent transparency and heat resistance despite it is made of a spontaneously integrating plastic material. The draw-molded article and, particularly, a container is effectively used for containing beverages.

5 Claims, 2 Drawing Sheets

RELATIONSHIP BETWEEN THE HALF−WIDTH OF CRYSTAL PEAK FOUND FROM BROAD−ANGLE X−RAY AND HEAT SHRINKAGE START TEMP. FOUND FROM TMA

MOLDED OBJECT OBTAINED THROUGH STRETCHING AND THERMAL FIXING AND PROCESS FOR PRODUCING THE SAME

TECHNICAL FIELD

The present invention relates to molded articles obtained by drawing and heat-setting a resin which chiefly comprises a polylactic acid. More specifically, the invention relates to molded articles having improved oriented crystallinity as well as improved properties such as heat resistance and the like.

PRIOR ART

As an ideal method of treating waste plastic materials, attention has been given to disintegrating plastic materials. Among them, there have heretofore been used spontaneously disintegrating plastic materials that disintegrate by the action of enzymes released by bacteria and true fungi.

However, though the spontaneously disintegrating plastics are excellent from the standpoint of harmony with environment such as spontaneous disintegration, they are not still satisfactory in regard to formability and mechanical strength of the draw-molded articles.

Among the spontaneously disintegrating plastic materials, for example, an aliphatic polyester exhibits poor melting property of the resin and cannot be put to the molding such as direct blow, injection draw molding or thermo-forming of sheet.

Accordingly, proposals have been made to improve the melt tension by the addition of an inorganic filler (Japanese Unexamined Patent Publication (Kokai) No. 5-289623) and to increase the molecular weight based on the extension of a chain by using a diisocyanate, an epoxy compound or an acid anhydride.

As the aliphatic polyesters, there have heretofore been known, for example, a polyhydroxybutylate (PHB), a random copolymer of 3-hydroxybutylate (3HB) and 3-hydroxyvalerate (3HV), a poly($\epsilon$-caprolactone) (PCL), a polybutylene succinate (PBS), a polybutylene succinate adipate (PBAS) and a polylactic acid (PLLA).

Among these aliphatic polyesters, a polylactic acid is the one that is mass-produced on an industrial scale, is easily available and is environmentally friendly.

The polylactic acid (PLLA) is a resin obtained from such starting materials as cereal starches such as of corn, and is a polymer obtained from such monomers as starches fermented with lactic acid and L-lactic acid. In general, the polymer is produced by the ring-opening polymerization of a lactide which is a dimer or by the direct polycondensation method.

The polymer is also drawing attention as a resin of the completely recycling type disintegrating into water and carbon dioxide due to microorganisms existing in the natural world. It further has a glass transition point (Tg) of about 60° C. which is close to Tg of the polyethylene terephthalate, which is an advantage.

However, when it is attempted to use a draw-molded article of polylactic acid in the applications of, for example, container for beverages, there still remain several problems that must be solved.

That is, to improve the preservability of the content that is to be filled, some pasteurization by heating or sterilization processing is necessary. The conventional draw-molded articles of polylactic acid, however, lack heat resistance and are thermally contracted even by being heated at a relatively low temperature.

Drawing and heat-setting serve as effective means for improving the heat resistance of the polyester containers inclusive of those of aliphatic ones. However, the draw-molded article of polylactic acid still lacks heat resistance based on the heat-setting. When heat-treated at high temperatures, the polylactic acid becomes lamellated exhibiting an increased haze, which may deteriorate the transparency of the containers.

DISCLOSURE OF THE INVENTION

It is therefore an object of the present invention to provide draw-molded articles of polylactic acid improving heat resistance without lowering the transparency of the draw-molded articles, containers or films for beverages, and a method of producing the same.

According to the present invention, there is provided a draw-molded and heat-set article obtained by draw-molding and heat-setting a hydroxyalkanoate resin comprising chiefly a polylactic acid, the draw-molded and heat-set article having a half-width (X) of a diffraction peak of $2\theta=10$ to $25°$ of not larger than 1.220° as found by a broad-angle X-ray measurement and, particularly, a container or a film.

In the draw-molded and heat-set article of the present invention, it is desired that:
1. the half-width (X) is not larger than 1.100°; and
2. the half-width (X) and a heat shrinkage start temperature (Y, ° C.) as found by the thermomechanical analysis (TMA) satisfy the following formula (1), $$Y \geq 4000 \exp(-10X)+54 \qquad (1)$$

In the draw-molded and heat-set article of the present invention, it is desired that the content of an optically active isomer (d) in the polylactic acid is not larger than 4.0% and, particularly, not larger than 3.0%, and that the haze of the molded article is not larger than 10% and, particularly, not larger than 4%.

The molded article of the present invention is useful, particularly, as a container for containing beverages.

According to the present invention, there is further provided a method of producing the above molded article by draw-molding and heat-setting a hydroxyalkanoate resin comprising chiefly the polylactic acid, the draw-molded article being heat-set at a temperature of from 70 to 150° C. and, particularly preferably, at a temperature of from 80 to 120° C.

BEST MODE FOR CARRYING OUT THE INVENTION

The present invention is concerned with a molded article obtained by draw-molding and heat-setting a hydroxyalkanoate resin comprising chiefly a polylatic acid, the molded article having a half-width (X) of a diffraction peak of $2\theta=10$ to $25°$ of not larger than 1.220° and, particularly, not larger than 1.100° as found by a broad-angle X-ray measurement.

As will be described later, the half-width (X) is measured over the side wall portion of the container when the molded article is a container, and is measured over the film when the molded article is a film.

In order to impart heat resistance to the container while maintaining transparency of the polylactic acid container, it was learned that the side wall of the container must have a half-width (X) of a diffraction peak of 2θ=10 to 25° of not larger than 1.220° and, particularly, not larger than 1.100° as found by a broad-angle X-ray measurement.

Reference should be made to Table 1 below. Namely, Table 1 shows a relationship between the heat-shrinking property of the container obtained by drawing and heat-setting the polylactic acid and the half-width (X) of the X-ray diffraction peak. The results tell that when the half-width (X) lies within the above range, the coefficient of heat shrinkage after preserved at 55° C. for 18 days can be suppressed to be smaller than 6%, offering a satisfactory heat resistance.

TABLE 1

Relationship between the half-width (X) and the heat-shrinking property.

| Half-width (X) | Heat-shrinking property (%) |
| --- | --- |
| 1.459 | 14.94 |
| 1.271 | 15.22 |
| 1.035 | 3.07 |
| 0.965 | 2.89 |
| 0.871 | 1.99 |

Figure 1:
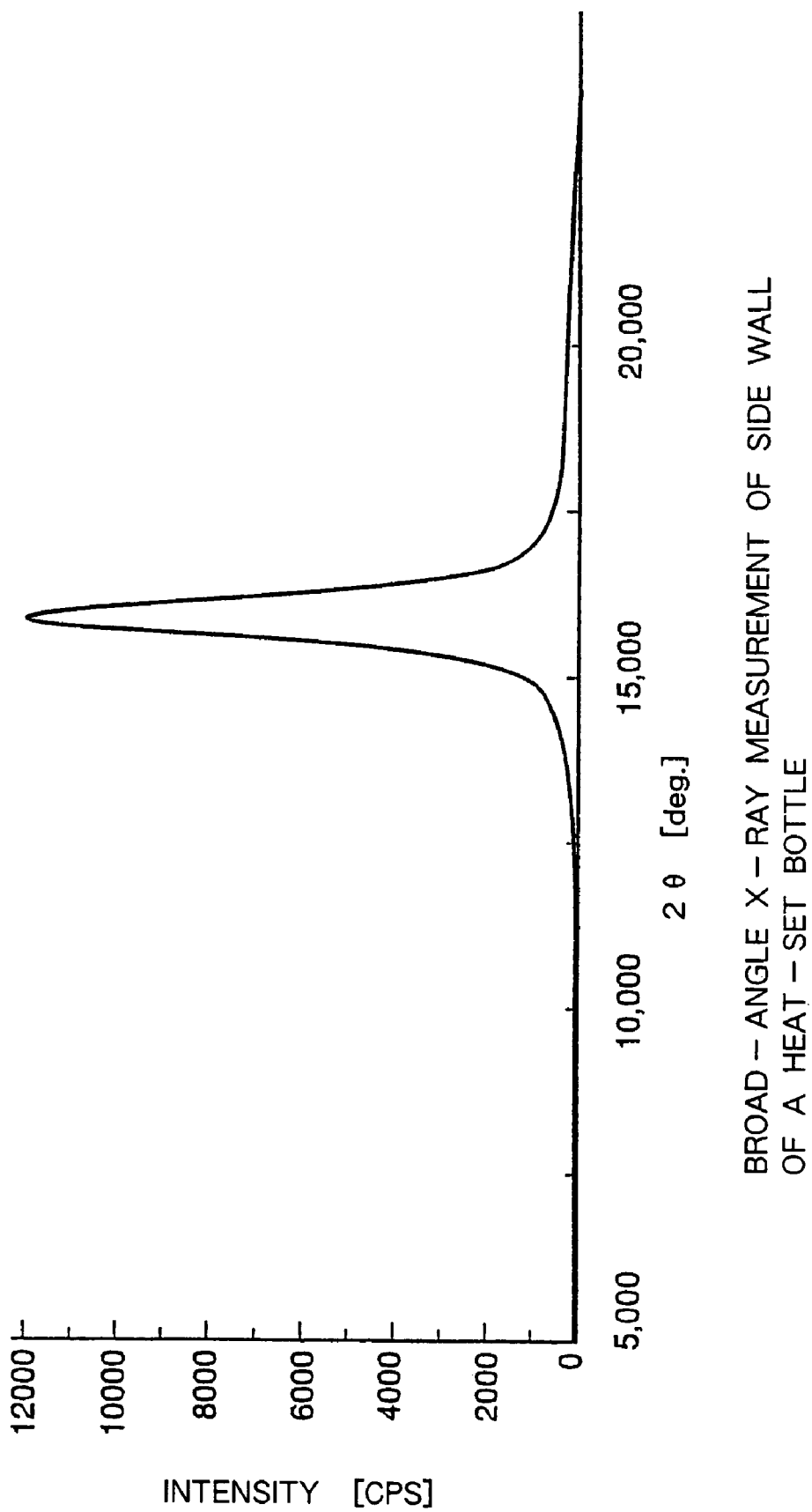
FIG. 1 is a diagram of an X-ray diffraction image of a molded article obtained by drawing and heat-setting a polylactic acid according to the present invention.

FIG. 1 in the attached drawings shows an X-ray diffraction image of the side wall of a container obtained by drawing and heat-setting the polylactic acid according to the present invention.

The half-width $D_{1/2}$ of the peak is found by finding a peak height H of the diffraction image and by drawing a horizontal line at a position of one-half the height H/2.

The X-ray diffraction peak shown in FIG. 1 is specific to the oriented crystals of the polylactic acid. A large half-width is exhibited even when the heat-setting is not effected or the heat-setting is effected but at a low heat-setting temperature. In these cases, however, the half-width decreases as the heat-setting temperature increases.

In the X-ray diffraction of crystals, in general, it has been known that intense peaks appear in the interference when the following Bragg's formula (2), $$n\lambda = 2 d_{hkl} \sin \theta \quad (2)$$

wherein n is a degree,

λ is a wavelength of the X-ray, dhkl is a spacing of (hkl) of a crystal, and

θ is an angle of diffraction, is satisfied. Between the sharpness of the interference peak and the size of the crystal, there further exists a relationship represented by the following Scherrer's formula (3), $$L_{hkl} = K\lambda / H \cos \theta \quad (3)$$

wherein Lhkl is a size of the crystal in a direction perpendicular to a plane (hkl), K is a constant of about 0.9, H is a half-width (radian) of the interference peak, and λ and θ are as defined in the above formula (2).

The X-ray diffraction peak which is a problem in the present invention is based on the molecular orientation of the polylactic acid. Therefore, the fact that the half-width (X) of the peak is small means that the degree of oriented crystallinity of the polylactic acid is increasing in the container of the invention.

In the present invention, it is also desired that the heat shrinkage start temperature (Y, ° C.) found by the thermomechanical analysis (TMA) and the half-width (X) are satisfying the following relationship (1), $$Y \geq 4000 \exp(-10X) + 54 \quad (1)$$

from the standpoint of heat resistance of the container.

As will be described later, the heat shrinkage start temperature (Y, ° C.) in the thermomechanical analysis (TMA) is found from a differentiated value of a temperature—distortion curve as a temperature corresponding to a point of inflection.

Figure 2:
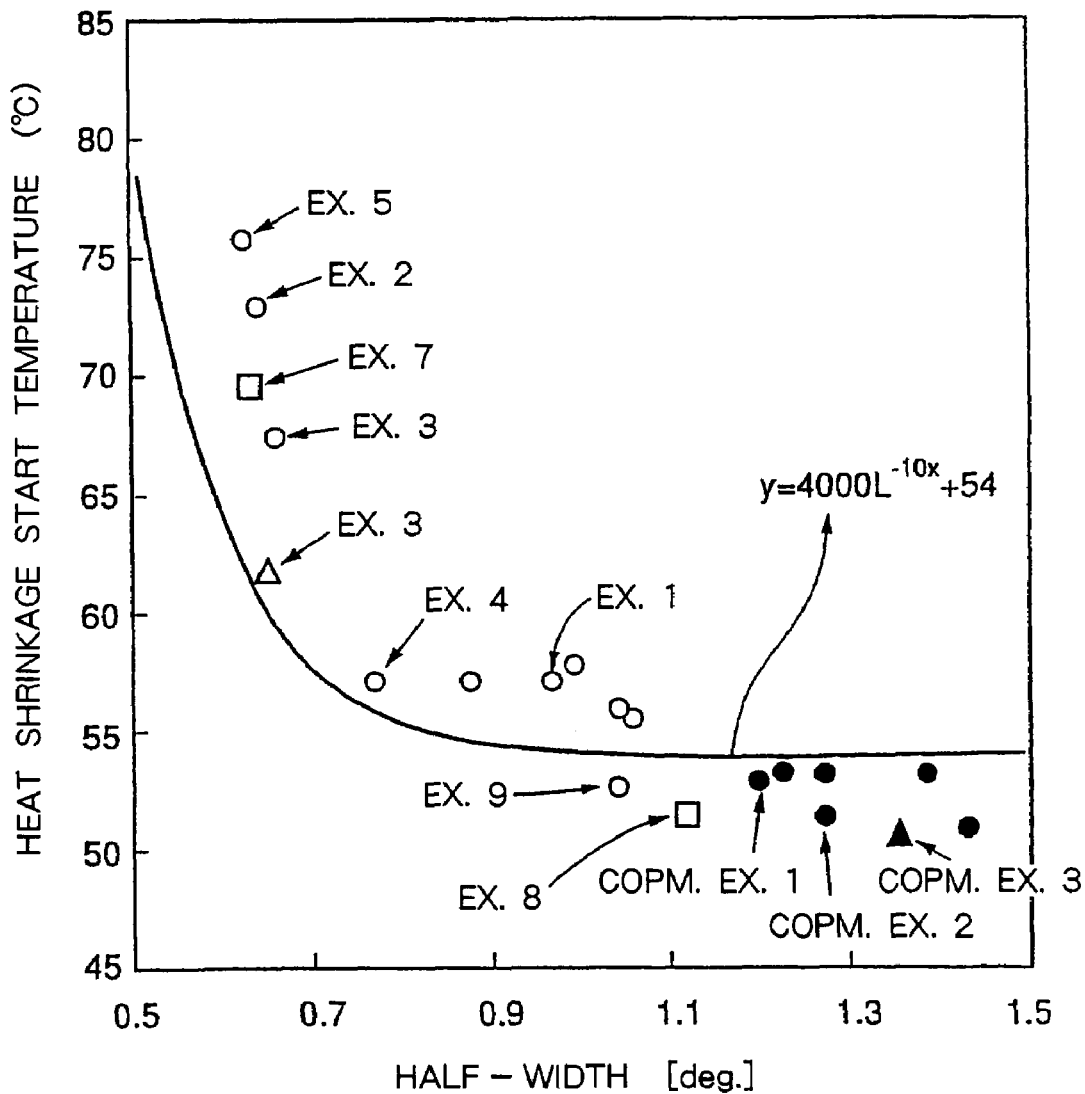
FIG. 2 is a graph drawn by plotting a side wall portion of a polylactic acid container with the heat shrinkage start temperature (Y) as the ordinate and the half-width (X) as the abscissa.

FIG. 2 in the accompanying drawings is drawn by plotting the side wall portion of the polylactic acid container of an example that will be described later with the heat shrinkage start temperature (Y) as the ordinate and the half-width (X) as the abscissa. A curve in the drawing corresponds to, $$Y = 4000 \exp(-10X) + 54 \quad (1a)$$

The results reveal an astonishing fact in that the heat resistance of the container is not satisfactory in the regions under the curve (1a) whereas in the regions over the curve (1a), the coefficient of heat shrinkage after preserved at 55° C. for 18 days can be suppressed to be smaller than 66, offering a satisfactory heat resistance.

In order to place the half-width (X) of the X-ray diffraction peak of the polylactic acid and the heat shrinkage start temperature (Y, ° C.) within the ranges specified by the present invention, it was learned that the content of the optically active isomer (d) in the polylatic acid plays an important role in addition to the degree of drawing and the degree of heat-set.

The polylactic acid that is commercially available is derived from a monomer which chiefly comprises an L-lactic acid. The polylactic acid, however, also contains a D-lactic acid though the content thereof may not be the same. The content of the optically active isomer (d) seriously affects the effect of heat-setting the draw-molded article, i.e., seriously affects the oriented crystallinity.

In the present invention, the content of the optically active isomer (d) in the polylactic acid is set to be not larger than 4.0% and, more preferably, not larger than 3%, in order to enhance the degree of oriented crystallinity based on the heat set.

In the container of the invention, the side wall of the container is oriented and crystallized, and the polylactic acid is suppressed from becoming spherular, offering such a feature that the side wall of the container has a haze of not larger than 10% and, particularly, not larger than 4%. Accordingly, the container of the invention has advantages of excellent transparency and good appearance. The above advantages are similarly accomplished even in the case of a film, as a matter of course.

The container or film of the present invention has excellent heat resistance, permits the content such as beverages to be hot-filled, can be subjected to the sterilization processing in a pasteurizer, and is particularly useful as a container for containing beverages.

[Polylactic Acid]

The polylactic acid used in the present invention comprises a recurring unit represented by the following formula (I),

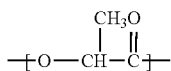

and in which the constituent unit substantially comprises the L-lactic acid, and the content of the D-lactic acid which is an optical isomer is not larger than 4%.

Though not limited thereto only, it is desired that the polylactic acid used in the present invention has a weight average molecular weight (Mw) of from 10,000 to 300,000 and, particularly, from 20,000 to 250,000. It is further desired that its density is from 1.26 to 1.20 g/cm$^3$, its melting point is from 160 to 200° C., and its melt flow rate (ASTM D1238, 190° C.) is from 2 to 20 g/10 min.

Depending upon the applications, the molded article of the present invention can be blended with a variety of coloring agents, fillers, inorganic or organic reinforcing agent, lubricant, anti-blocking agent, plasticizer, leveling agent, surfactant, viscosity-increasing agent, viscosity-decreasing agent, stabilizer, antioxidant and ultraviolet-ray absorbing agent according to known recipe.

In the molded article of the invention, the above polylactic acid may be used alone, as a blend with other aliphatic polyester or resin, or as a laminate with other resins.

As the other aliphatic polyesters, there can be exemplified polyhydroxyalkanoates such as 3-hydroxybutylate, 3-hydroxyvalerate, 3-hydroxycaproate, 3-hydroxyheptanoate, 3-hydroxyoctanoate, 3-hydroxynanoate, 3-hydroxydecanoate, γ-butylolactone, δ-valerolactone and ε-caprolactone, or copolymers thereof.

Further, the molded article of the present invention, may use the above polylactic acid or a resin composition thereof as a single layer, or as a laminate with other resins depending upon the properties of the content. For the applications where., for example, oxygen barrier property is required, there is used a gas barrier resin such as an ethylene/vinyl alcohol copolymer or a metaxylyleneadipamide (MXD6) in the form of a laminate. For the applications where water vapor barrier property is required, there is used a water vapor barrier resin such as a cyclic olefin copolymer in the form of a laminate. Moreover, the molded article of the present invention may be provided with a coating layer such as a metal oxide in order to improve the gas barrier property.

[Molded Article and a Method of its Production]

The molded article of the present invention is produced by draw-molding and heat-setting a hydroxyalkanoate resin comprising chiefly the polylactic acid.

As a pre-molded article for draw-molding for producing a container, for example, there can be used a preform with bottom for draw-blow molding or a sheet for solid-phase molding in accordance with a known method such as injection molding, compression molding or extrusion molding.

In the case of the preform with bottom used for the draw-blow molding, the molten polyester is injected to obtain, in a noncrystalline state, the preform with bottom having a mouth-and-neck portion that corresponds to the final container.

In carrying out the injection molding, the polyester is melt-injected into an injection mold that has been cooled. As the injection machine, there is used a known one equipped with an injection plunger or a screw, and the polyester is injected into the injection mold through a nozzle, a sprue and a gate. Then, the polyester flows into a cavity in the injection mold, and is solidified to form a noncrystalline preform for draw-blow molding.

As the injection mold, there is used the one having a cavity corresponding to the shape of a neck of a container. Here, it is desired to use the injection mold of the one-gate type or of the multi-gate type. The injection temperature is desirably from about 170 to about 220° C.

The preform can be draw-blow molded by once preparing the preform in a cooled state, and heating the preform at a drawing temperature to draw-mold it (cold parison method), or by effecting the draw-molding following the pre-forming by utilizing the heat given to the preform that is being molded, i.e., by utilizing the remaining heat (hot parison method). The former method is preferred.

It is desired that the heating temperature (drawing temperature) for drawing the preform is in a range of, usually, from 70 to 150° C. and, particularly, from 80 to 120° C.

In conducting the biaxial draw-blow molding to obtain a bottle, the preform or the parison at the drawing temperature is drawn in the axial direction in the blow mold and is inflation-drawn in the circumferential direction by blowing a fluid.

It is desired that the biaxial draw-blow molding is conducted at a drawing ratio of from 1.5 to 5.0 times, particularly, from 2 to 3 times, at a drawing ratio in the circumferential direction of from 1.5 to 5.0 times, particularly, from 2 to 3 times, and at an area drawing ratio of from 2.25 to 9.0 times and, particularly, from 4 to 7 times.

When the pre-blowing is effected with a fluid of a low pressure prior to effecting the blowing with a gas of a high pressure, the drawing speed is determined based on the one that has been drawn by the pre-blowing.

It is desired that the pressure of the pressurized fluid is as high as possible. In general, it is desired that the initial pressure of the gas that is used is not smaller than 20 kg/cm$^2$ and, particularly, in a range of from 30 to 40 kg/cm$^2$ though it may vary depending upon the capacity of the final container or the thickness of the preform. The pressure applied into the preform may remain uniform throughout the molding, or a high pressure may be applied in the first stage. The pressurizing fluid may be the unheated air or an inert gas, or may be the heated air or the inert gas.

In the present invention, the preform with bottom can be draw-blow molded and heat-set by either the one-mold method (one-step method) or the two-mold method (two-step method).

In the case of the one-mold method, there is used a cavity mold of a shape corresponding to the final container, the surface temperature of the cavity mold is maintained at a thermally-setting temperature, and the draw-blow molding and the heat-setting are conducted in one mold.

It is desired that the heat-setting temperature is usually in a range of from 70 to 150° C. and, particularly, from 90 to. 120° C. The oriented crystallinity increases with an increase in the heat-setting temperature. There, however, exists a suitable temperature range from the standpoint of taking out from the mold (preventing the deformation at the time of taking out).

In the case of the two-mold method, an intermediate product obtained by draw-blow molding the preform maintained at the drawing temperature is subjected to the heat-setting by heating and to the thermal shrinking for removing distortion, and the thermally shrunk intermediate product is blow-molded in the cavity mold of a shape corresponding to the final container to obtain the final container.

The blow molding in the first step can be conducted in the metal mold, and the intermediate product can be produced by the free blow-molding. In the free blow-molding, the preform at the drawing temperature can be drawn in the axial direction by using a drawing rod without using the metal mold for blow-molding, and can be inflation-drawn in the circumferential direction by blowing a fluid.

The free blow-molding has an advantage in that the bottom portion and the barrel portion can be formed into a secondary molded article having a relatively uniform thickness compared to that of the conventional molding using a metal mold, and it is made possible to reduce the thickness of the bottom portion like the barrel portion by the free blowing.

In the two-step method, the intermediate product obtained through the biaxial draw-blow molding is heated to heat-set the barrel portion and the bottom portion, while permitting the shrinking. Usually, the heating temperature is desirably from 70 to 150° C. and, particularly, from 80 to 120° C. The heating can be conducted by using an infrared-ray or the like. Upon heating the intermediate product, the polyester constituting the container wall is oriented and crystallized inclusive of the bottom portion and the barrel portion, the residual stress is relaxed, and there is obtained a secondary intermediate product having a volume that is slightly shrunk.

During this heat treatment, the fluid in the intermediate product may be released, or the fluid having a low degree of pressure may be confined in the intermediate product.

Finally, in the two-step method, the secondary intermediate product in the step of heat treatment is blow-molded in the metal mold for the final blow-molding to obtain a final container.

In the final blow-molding, the cavity of the metal mold for blow-molding must be larger than the secondary intermediate product so as to be in agreement with the size and shape of the finally molded article, as a matter of course.

The temperature of the final blow molding has allowance in the temperature compared to the free draw-blow molding, may be lower or higher than that of the free draw-blow molding and is, usually, from 60 to 150° C. and, particularly, from 70 to 140° C.

Further, the secondary intermediate product has a modulus of elasticity that is increased due to the crystallization through the treatment with heat. It is, therefore, desired to conduct the final blow molding by using a fluid pressure higher than that in the blow molding of the first step and, generally, by using a pressure of from 30 to 40 kg/cm$^2$.

In conducting the final blow molding, the temperature of the metal mold may be maintained at 15 to 150° C., and the cooling may be effected right after the molding. Or, the cold air may be blown into the finally molded article to cool it.

The molded article of the present invention may be a cup-like container obtained by draw-molding and heat-setting the polylactic acid sheet in the solid phase.

By extruding the molten polylactic acid resin through a T-die, there is formed an amorphous sheet for compressed air molding or plug assisted molding to obtain a cup.

After heated at a drawing temperature, the sheet is held by a clamp and is pressed by a plug so as to be drawn in the axial direction and is, then, drawn in the circumferential direction by blowing a compressed fluid therein. The draw-molded article is, then, heat-set by the conduction of heat from the cavity mold.

The drawing temperature, heat-setting temperature and the drawing ratio may comply with the conditions of the biaxial draw-blow molding.

The molded article of the present invention may be a drawn and heat-set film obtained by biaxially drawing and heat-setting an undrawn film (cast film).

The molten polylactic acid resin is drawn through the T-die and is quickly quenched to obtain an amorphous film (cast film) for drawing.

The amorphous film is heated at a drawing temperature, fed to a biaxially drawing machine such as a tenter so as to be drawn in the longitudinal direction and in the transverse direction, and the drawn film is, then, heat-set. The biaxial drawing may be the simultaneous drawing or the sequential drawing.

The drawing temperature, heat-setting temperature and drawing ratio may comply with the above-mentioned conditions.

As will become obvious from the results of Examples appearing later, the draw-molded article of the present invention exhibits excellent heat resistance and, particularly, dimensional stability, such as a coefficient of contraction in the axial direction at 55° C. of not larger than 6% and, particularly, not larger than 5%.

Further, the draw-molded container of the present invention is not whitened by the over-drawing or by the thermal crystallization (lamellation), and exhibits a haze on the side wall of not larger than 10% and, particularly, not larger than 4% featuring excellent transparency.

EXAMPLES

Next, the invention will be described by way of Examples. It should be noted that the invention is in no way limited to the following Examples only.

Molding a Bottle:

A preform having a mouth of a diameter of 28 mm was molded by injecting a polylactic acid having a weight average molecular weight of not smaller than 160,000 and containing an optically active isomer (d %) in an amount of not smaller than 1.3 but not larger than 4.5% by using an injection-molding machine at a barrel temperature in a range of from 190 to 210° C. Then, the preform was heated at not lower than 70° C. by using an infrared-ray heater and was molded into a square bottle having a volume of 400 ml by using a metal blow-molding machine. Here, the metal mold temperature during the blow molding was varied over a range of from 50° C. to 100° C. to effect the heat-setting.

Molding a Cup:

By using the above polylactic acid, a polylactic acid sheet having a width of 400 mm and a thickness of 2 mm was obtained by using an extruder at a barrel temperature over a range of from 190 to 200° C. and at a T-die temperature of 190° C. Next, by using a thermoform molding machine, the polylactic acid sheet was heated at a temperature of not lower than 70° C., drawn in the longitudinal direction by a conical plug assist, press-adhered by using the compressed air onto a female mold maintained at a temperature of from 50° C. to 100° C., and was cooled with the cooling air so as to be molded into a cylindrical cup having a mouth of a diameter of 80 mm, a bottom of a diameter of 50 mm and a height of 90 mm.

Molding a Film:

By using an extrusion molding machine, the above polylactic acid was extrusion-molded at a barrel temperature over a range of from 190 to 210° C. and at a T-die temperature of 190° C. The polylactic acid was extruded into a film of a width of 800 mm and a thickness of 900 μm, and was, then, biaxially drawn into 3×3 times (average thickness of 100 μm) by using a tenter type biaxial drawing machine.

Evaluation:

(Heat-shrinking Property)

Full-filled contents of the bottle and the cup were found by filling tap water maintained at 20° C. Next, the bottle and the cup were held in a constant-temperature vessel maintained at 55° C., and after 18 days have passed, the full-filled contents thereof were measured again. The coefficient of heat contraction was calculated from the full-filled content $W_1$ of after the passage of time and from the initial full-filled content $W_0$ in compliance with the formula, $$(W_0-W_1)/W_0\times 100(\%)$$

The bottle, cup and film having coefficients of heat contraction of smaller than 6% are denoted by ○, and □, respectively, and the bottle, cup and film having coefficients of heat contraction of not smaller than 6% are denoted by ●, ▲ and ■, respectively, in FIG. 2.

(Thermomechanical Analysis)

Flat side wall portions of the bottle and the cup were cut into squares of 15 mm×5 mm, and were subjected to the TMA measurement under the conditions of a distance between the chucks of 10 mm, a load of 10 gf, an initial temperature of 30° C., and a temperature at the end of measurement of 90° C. by elevating the temperature at a rate of 5° C./min. The obtained temperature—strain curve was differentiated to find a point of inflection which was regarded to be a heat shrinkage start temperature.

(Broad-angle X-ray Analysis)

Flat side wall portions of the bottle and the cup were cut into squares of 25 mm×25 mm, fixed to square apertures of 20 mm×15 mm, and were put to the X-ray measurement by using an X-ray diffraction apparatus. Next, half-widths of the peaks were found.

Example 1

A polylactic acid bottle was prepared by heat-setting a polylactic acid containing an optically active isomer (d %) in an amount of d %=1.4% and having a weight average molecular weight of 200,000 at a metal mold temperature of 70° C.

The half-width (X) as found from the broad-angle X-ray measurement was 0.965°, and the heat shrinkage start temperature (Y) as found from the thermomechanical analysis was 57.3° C. FIG. 2 shows a relationship between the half-width (X) and the heat shrinkage start temperature (Y).

These relationships satisfied the requirements of the half-width (X) of not larger than 1.220° and of the above formula (1). The coefficient of heat contraction of the obtained bottle was smaller than 6%.

Example 2

A polylactic acid bottle was prepared by heat-setting a polylactic acid containing an optically active isomer (d %) in an amount of d %=1.4% and having a weight average molecular weight of 200,000 at a metal mold temperature of 100° C.

The half-width (X) as found from the broad-angle X-ray measurement was 0.635°, and the heat shrinkage start temperature (Y) as found from the thermomechanical analysis was 73.1° C. FIG. 2 shows a relationship between the half-width (X) and the heat shrinkage start temperature (Y).

These relationships satisfied the requirements of the half-width (X) of not larger than 1.220° and of the above formula (1). The coefficient of heat contraction of the obtained bottle was smaller than 6%.

Example 3

A polylactic acid bottle was prepared by heat-setting a polylactic acid containing an optically active isomer (d %) in an amount of d %=1.9% and having a weight average molecular weight of 200,000 at a metal mold temperature of 100° C.

The half-width (X) as found from the broad-angle X-ray measurement was 0.653°, and the heat shrinkage start temperature (Y) as found from the thermomechanical analysis was 67.7° C. FIG. 2 shows a relationship between the half-width (X) and the heat shrinkage start temperature (Y).

These relationships satisfied the requirements of the half-width (X) of not larger than 1.220° and of the above formula (1). The coefficient of heat contraction of the obtained bottle was smaller than 6%.

Example 4

A polylactic acid bottle was prepared by heat-setting a polylactic acid containing an optically active isomer (d %) in an amount of d %=2.5% and having a weight average molecular weight of 200,000 at a metal mold temperature of 80° C.

The half-width (X) as found from the broad-angle X-ray measurement was 0.765°, and the heat shrinkage start temperature (Y) as found from the thermomechanical analysis was 57.2° C. FIG. 2 shows a relationship between the half-width (X) and the heat shrinkage start temperature (Y).

These relationships satisfied the requirements of the half-width (X) of not larger than 1.220° and of the above formula (1). The coefficient of heat contraction of the obtained bottle was smaller than 6%.

Example 5

A polylactic acid containing an optically active isomer (d %) in an amount of d %=1.4% and having a weight average molecular weight of 200,000 was heated at not lower than 70° C. by using a quartz heater, and was freely blown into a size of 1.0 L. The polylactic acid was then externally heated by using a ceramic heater so as to be thermally contracted into a size that could be inserted in the final mold. The polylactic acid was then two-step blow-molded into a bottle having a volume of 400 ml at a metal mold temperature of 110° C. The half-width (X) as found from the broad-angle X-ray measurement was 0.6240, and the heat shrinkage start temperature (Y) as found from the thermomechanical analysis was 76.2° C. FIG. 2 shows a relationship between the half-width (X) and the heat shrinkage start temperature (Y).

These relationships satisfied the requirements of the half-width (X) of not larger than 1.220° and of the above formula (1). The coefficient of heat contraction of the obtained bottle was smaller than 6%.

Comparative Example 1

A polylactic acid bottle was prepared by heat-setting a polylactic acid containing an optically active isomer (d %) in an amount of d %=3.2% and having a weight average molecular weight of 200,000 at a metal mold temperature of 60° C.

The half-width (X) as found from the broad-angle X-ray measurement was 1.224°, and the heat shrinkage start temperature (Y) as found from the thermomechanical analysis was 53.3° C. FIG. 2 shows a relationship between the half-width (X) and the heat shrinkage start temperature (Y).

The half-width (X) was not smaller than 1.220° and the coefficient of heat contraction of the obtained bottle was not smaller than 6%.

Comparative Example 2

A polylactic acid bottle was prepared by heat-setting a polylactic acid containing an optically active isomer (d %) in an amount of d %=4.2% and having a weight average molecular weight of 200,000 at a metal mold temperature of 60° C.

The half-width (X) as found from the broad-angle X-ray measurement was 1.271°, and the heat shrinkage start temperature (Y) as found from the thermomechanical analysis was 51.5° C. FIG. 2 shows a relationship between the half-width (X) and the heat shrinkage start temperature (Y).

The half-width (X) was not smaller than 1.220° and the coefficient of heat contraction of the obtained bottle was not smaller than 6%.

Example 6

A polylactic acid cup was prepared by heat-setting a polylactic acid containing an optically active isomer (d %) in an amount of d %=1.4% and having a weight average molecular weight of 200,000 at a metal mold temperature of 100° C.

The half-width (X) as found from the broad-angle X-ray measurement was 0.630°, and the heat shrinkage start temperature (Y) as found from the thermomechanical analysis was 62.5° C. FIG. 2 shows a relationship between the half-width (X) and the heat shrinkage start temperature (Y).

These relationships satisfied the requirements of the half-width (X) of not larger than 1.220° and of the above formula (1). The coefficient of heat contraction of the obtained cup was smaller than 6%.

Comparative Example 3

A polylactic acid cup was prepared by heat-setting a polylactic acid containing an optically active isomer (d %) in an amount of d %=1.4% and having a weight average molecular weight of 200,000 at a metal mold temperature of 50° C.

The half-width (X) as found from the broad-angle X-ray measurement was 1.362°, and the heat shrinkage start temperature (Y) as found from the thermomechanical analysis was 50.9° C. FIG. 2 shows a relationship between the half-width (X) and the heat shrinkage start temperature (Y).

The half-width (X) was not smaller than 1.220° and the coefficient of heat contraction of the obtained cup was not smaller than 6%.

Example 7

A biaxially drawn film was prepared from a polylactic acid containing an optically active isomer (d %) in an amount of d %=2.5% and having a weight average molecular weight of 200,000, and was heat-set by heating the film surface at a temperature of 100° C. by using an infrared-ray heating device. The half-width (X) as found from the broad-angle X-ray measurement was 0.620°, and the heat shrinkage start temperature (Y) as found from the thermomechanical analysis was 70.0° C. FIG. 2 shows a relationship between the half-width (X) and the heat shrinkage start temperature (Y).

These relationships satisfied the requirements of the half-width (X) of not larger than 1.220° and of the above formula (1). The coefficient of heat contraction of the obtained film was smaller than 6%.

Example 8

A biaxially drawn film was prepared from a polylactic acid containing an optically active isomer (d %) in an amount of d %=2.5% and having a weight average molecular weight of 200,000. The half-width (X) as found from the broad-angle X-ray measurement was 1.105°, and the heat shrinkage start temperature (Y) as found from the thermomechanical analysis was 52.0° C. FIG. 2 shows a relationship between the half-width (X) and the heat shrinkage start temperature (Y).

These relationships satisfied the requirements of the half-width (X) of not larger than 1.220°, and the heat shrinkage start temperature (Y) was 52.0° C. The coefficient of heat contraction of the obtained film was smaller than 6%.

Example 9

A polylactic acid bottle was prepared by heat-setting a polylactic acid containing an optically active isomer (d %) in an amount of d %=3.5% and having a weight average molecular weight of 200,000 at a metal mold temperature of 70° C.

The half-width (X) as found from the broad-angle X-ray measurement was 1.020°, and the heat shrinkage start temperature (Y) as found from the thermomechanical analysis was 53.0° C. FIG. 2 shows a relationship between the half-h width (X) and the heat shrinkage start temperature (Y).

These relationships satisfied the requirements of the half-width (X) of not larger than 1.220°, and the heat shrinkage start temperature (Y) was 53.0° C. The coefficient of heat contraction of the obtained bottle was smaller than 6%.

The invention claimed is:

1. A biaxially draw-blow-molded and heat-set container obtained by biaxially draw-blow-molding and heat-setting a polylactic acid, characterized in that the content of the optically active isomer (d) in the polylactic acid is set to be not larger than 4.0%, and the biaxially draw-blow-molded and heat-set container has a half-width (X) of a diffraction peak of 2 Θ=10 to 25° of not larger than 1.220° as found by a broad-angle X-ray measurement.

2. A biaxially draw-blow-molded and heat-set container as set forth in claim 1, wherein the half-width (X) is not larger than 1.100°.

3. A biaxially draw-blow-molded and heat-set container as set forth in claim 1, wherein the half-width (X) and heat shrinkage start temperature (Y, ° C.) as found by thermomechanical analysis (TMA) satisfy the following formula (1), $$Y \geq 4000 \exp(-10X)+54 \qquad (1).$$

4. A biaxially draw-blow-molded and heat-set container as set forth in claim 1, wherein the haze of the container is not larger than 10%.

5. A method of producing a biaxially draw-blow-molded and heat-set container as set forth in claim 1, by draw-blow-molding and heat-setting a polylactic acid characterized in that the content of the optically active isomer (d) in the polylactic acid is set to be not larger than 4.0%, the biaxially draw-blow-molded and heat-set container being heat-set at a temperature of from 70 to 150° C.

* * * * *